UNITED STATES PATENT OFFICE.

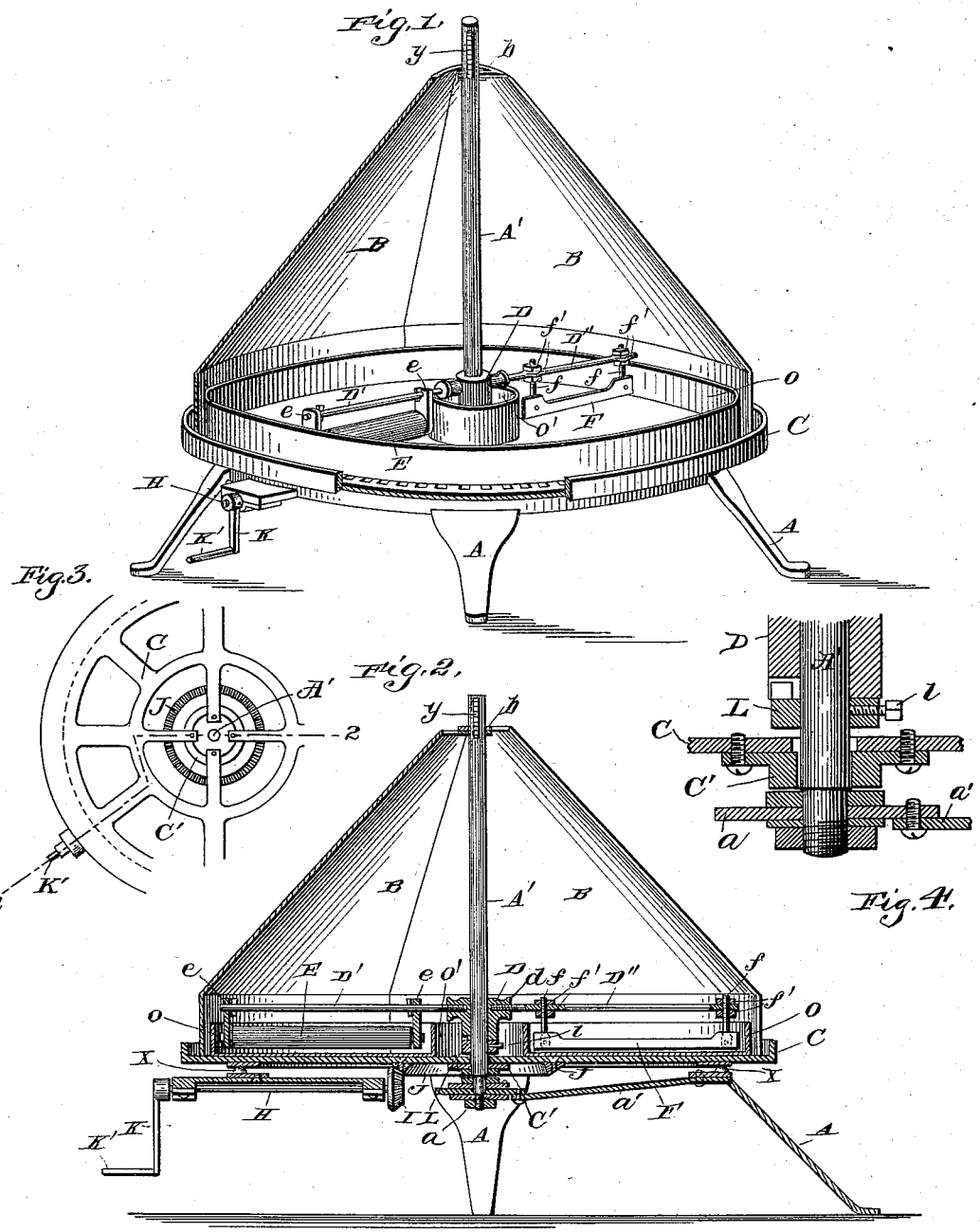
(No Model.)
M. A. OVERTON.
PORTABLE DRIER.
No. 532,089. Patented Jan. 8, 1895.

MARY A. OVERTON, OF FOND DU LAC, WISCONSIN.

PORTABLE DRIER.

SPECIFICATION forming part of Letters Patent No. 532,089, dated January 8, 1895.

Application filed November 11, 1892. Serial No. 451,713. (No model.)

*To all whom it may concern:*

Be it known that I, MARY A. OVERTON, a citizen of the United States, residing at Fond du Lac, in the county of Fond du Lac and State of Wisconsin, have invented a new and useful Apparatus for Drying Eggs, Yeast, Vegetables, or Like Materials, of which the following is a specification.

My invention relates to improvements in driers for domestic use; and the object of my improvement is to provide a cheap, metallic, portable, cooking utensil to be used in the kitchen, and on cook stoves, ranges, &c., for the purpose of preserving by drying, edible and cooking material. I attain these objects by the mechanism illustrated in the accompanying drawings, in which—

Figure 1 is a view in perspective of the entire machine, with parts of cover broken away, to show the interior. Fig. 2 is a sectional elevation of the machine on line 2—2— Fig. 3. Fig. 3 is a top plan view of a portion of a turn table, and Fig. 4 is an enlarged detail sectional view of the bottom of the central standard and the adjacent parts.

Similar letters refer to similar parts throughout the several views.

The round stand with its legs A A with radial arms $a'$ converging into a central socket or plate $a$ supporting the vertical, rigid shaft A' constitute the frame work of the machine. All the parts above this stand A are supported by it, and are removable respectively by lifting up and over the top of the shaft A'.

With the rim of the central socket or plate $a$ for its bearing, an annular flange C' turns on the shaft A', and supports, and rotates with the attached, round, open work table C, which is rotated horizontally by means of the bevel gear I J, operated through the shaft H, and crank K K', or by any other well known means. On the outer rim of the stand A are raised at intervals small balls or bearings $x\ x$ for the support and steadying of the outer rim of the table C.

A hub D provided with radial sockets $d$ is attached and kept from turning by means of a clutch L secured by a set screw $l$ to the shaft A' just above the center of the table C. This clutch has a tooth $l'$ which engages with a notch in the hub D and thus prevents the latter from turning on the shaft. In the sockets $d$ are removably secured the two opposite and lateral arms D' D'', upon one of which D' is suspended loosely by means of links $e, e$, a swinging roller E and on the other arm D'' is affixed rigidly by the stems $f f$ the scraper F. This scraper is adjusted vertically by the thumb nuts $f' f'$ turning on the threaded upper ends of the stems $f f$. These, roller and scraper, operate on the material to be dried in the annular tray O, and which is a tin or sheet iron pan resting upon the open work table C and revolving with it. A narrow open space is left between the outer rim of the tray O, and the wall of the casing B, and the throat O' of the inner rim of the tray should be large enough for the ample passage upward of the heated air.

The whole inner mechanism is incased with four conical sections of tin or metal plate suspended by wire loops $b\ b$ near the top of shaft A', and swinging around the same, so that when closed together the sections will form a close case B, with a sufficient opening or flue at the top to permit the escape of the hot air and steam from the inside.

A thermometer, $y$, may be hung at the upper end of the shaft A', in the current of the flue, for indicating the heat; and the turning more or less of the sections B B, will ventilate, and reduce the inside heat at will.

As before remarked, each and all of the parts above the stand A and around the shaft A' may be readily detached, or replaced by lifting off, or slipping over, the vertical shaft A'.

The operation of my invention is as follows: The apparatus is placed upon a stove or other source of heat, and the material to be treated is put into the pan O. Upon turning the crank, the turntable, pan and cover are rotated around the vertical shaft A', the stationary scraper acting to stir the material, and the roller serving to pulverize it when it dries in lumps. If the material is coffee, peanuts, corn or the like, the roller may be removed by unscrewing the arm D' from its socket.

Having thus shown the construction and operation of my machine, I claim as my invention—

1. A portable drier for domestic use, comprising a suitable stand, a stationary upright shaft at the center of said stand, an open-work turn-table rotatable on said shaft, means for rotating said turn-table, a loose annular pan adapted to pass down over said shaft and be removably supported on said table, one or more arms removably secured to said shaft, and devices supported on said arms to operate upon the material in the pan when the latter is rotated, substantially as described.

2. A portable drier consisting of a central stationary shaft, the open-work table rotatable thereon, the annular pan supported on said table, one or more arms secured to said shaft, and carrying devices to operate on the material within the pan, and a sectional hood rotatably mounted on the shaft, and comprising segmental portions adapted to slide concentrically, one over the other, substantially as described.

3. A portable drier consisting of a central stationary shaft, an annular pan rotatably supported concentric with said shaft, means for rotating said pan, one or more radial arms secured to said shaft, and a swinging roller hung on an arm and depending within the pan, substantially as described.

4. In a portable drier, a vertical shaft, an annular rotatable pan concentric therewith, a radial arm on said shaft, and a scraper having at each end a threaded stem and adjusting nuts for attaching it to said arm, substantially as described.

MARY A. OVERTON.

Witnesses:
A. F. HARISON,
F. F. DUFFY.